United States Patent
Stichter

(10) Patent No.: US 6,785,283 B1
(45) Date of Patent: Aug. 31, 2004

(54) QUALITY OF SERVICE (QOS) ENFORCEMENT METHOD

(75) Inventor: Allen W. Stichter, Flemington, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/475,596

(22) Filed: Dec. 30, 1999

(51) Int. Cl.[7] .......................... H04L 12/56; H04L 12/26
(52) U.S. Cl. ................ 370/395.42; 370/230; 370/395.6
(58) Field of Search .................. 370/395.21, 395.4, 370/395.41, 395.42, 230, 231, 235, 238.1, 395.1, 395.3, 395.64, 465, 232

(56) References Cited

U.S. PATENT DOCUMENTS

| | | | | |
|---|---|---|---|---|
| 5,889,779 A | * | 3/1999 | Lincoln | 370/398 |
| 6,009,077 A | * | 12/1999 | Firoiu et al. | 370/230 |
| 6,028,843 A | * | 2/2000 | Delp et al. | 370/235 |
| 6,072,800 A | * | 6/2000 | Lee | 370/412 |
| 6,088,734 A | * | 7/2000 | Marin et al. | 709/232 |
| 6,396,834 B1 | * | 5/2002 | Bonomi et al. | 370/394 |
| 6,477,168 B1 | * | 11/2002 | Delp et al. | 370/395.4 |
| 6,574,223 B1 | * | 6/2003 | Brueckheimer et al. | 370/395.6 |

* cited by examiner

*Primary Examiner*—Afsar Qureshi

(57) ABSTRACT

A method for deadline based scheduling for asynchronous transfer mode adaptation layer, type 2, messages, in accordance with the present invention, includes calculating, for a list of channels, a last possible transmit time for messages on each of the channels in accordance with system criteria. The list of channels is prioritized in an ordered list based on a last possible transmit time for the messages for each of the channels. The messages for the channels are transmitted in accordance with the ordered list. Also disclosed is a method for requesting for quality of service.

18 Claims, 2 Drawing Sheets

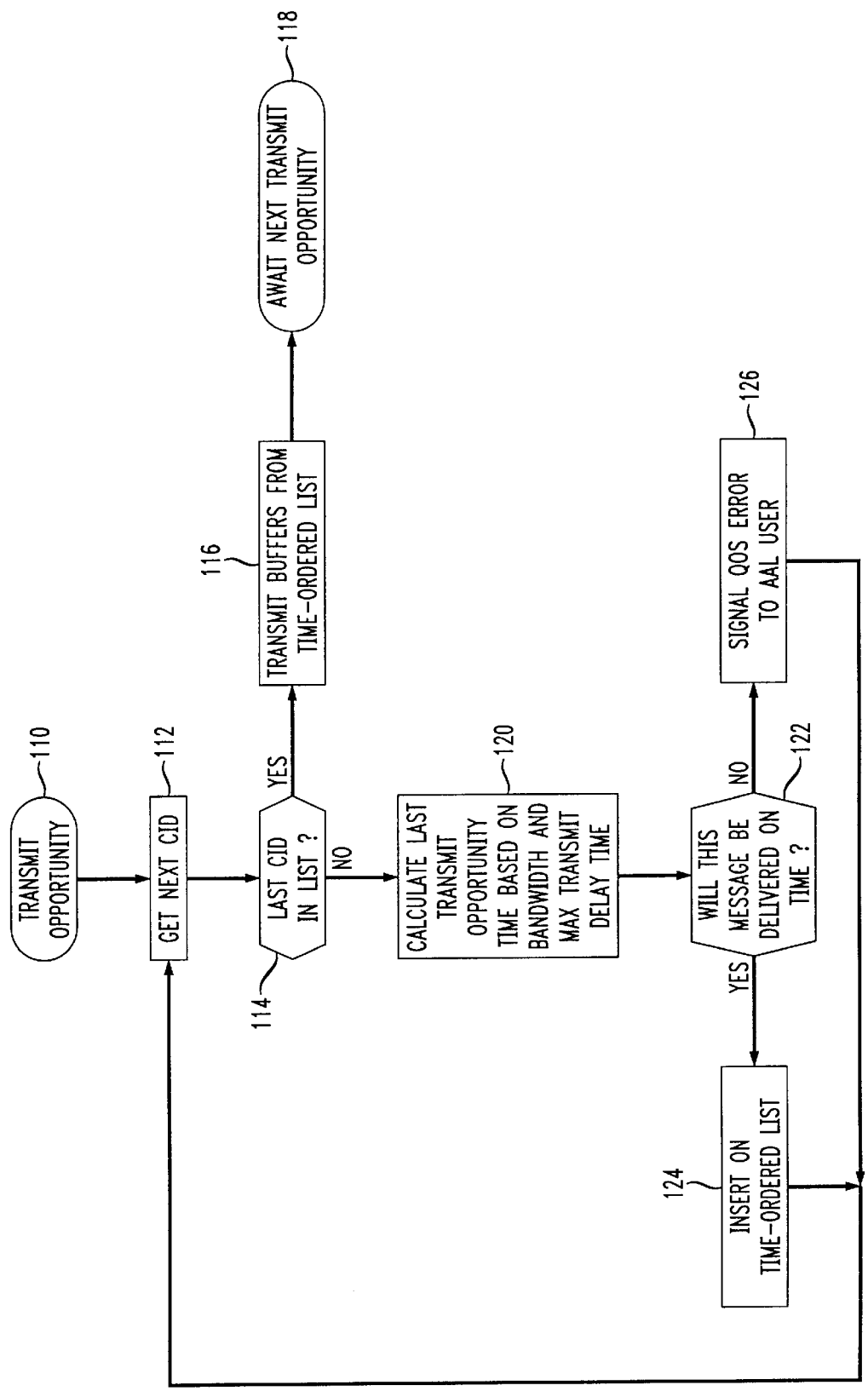

QUALITY OF SERVICE (QOS) ENFORCEMENT METHOD

BACKGROUND OF THE INVENTION

1. Field of the Invention

The present invention relates to scheduling methods, and more particularly to a method for enforcing quality of service (QOS) protocols for multiplexed channels in the AAL2 protocol.

2. Description of the Related Art

The term 'leaky bucket algorithm' is used to refer to a cell-policing policy known in the art as the Generic Cell Rate Algorithm. This policy receives asynchronous transfer mode (ATM) cells into a "bucket", and leaks the ATM cells out of the bucket at a contracted (requested) rate using metrics like the PCR (Peak Cell Rate) to specify the Quality of Service. The bucket or leaky bucket is typically a storage device, such as a cache, or allocated memory in a storage device. A buffer or buffers are filled, and data is "leaked" to subscribers at a predetermined rate. The data is distributed, typically in a round-robin manner. The round-robin technique generates a list of data packets to be distributed and sends the next packet according to the amount of data to be sent and the number of sources of the data. The round-robin system may result in the distribution of data, which is not consistent with the data's urgency. In other words, data from one user may be distributed ahead of schedule without taking advantage of delay budgets typically allocated to system components. This may result in some subscribers or users getting quicker service while others slower service. In a worst case scenario, subscribers or users receiving slower service may actually "time-out" resulting in a loss of the data at a service access point.

The leaky bucket algorithm works well in ATM switches where the switch moves cells from one ATM link to another. The switch never looks at the payload of the cell; instead, switching is based on an ATM header which includes the relevant routing information.

Multiplexed data streams, like that of the ATM adaptation layer 2 (AAL2) protocol, cannot be handled by the leaky bucket algorithm, since the information to be controlled is contained within the cell's payload.

ATM Network Protocols, for example, the ITU-T I.363.2, do not specify a protocol for AAL2 multiplexing in the ATM adaptation layer (AAL). Further, the ITU-T I.363.2 network protocol which includes the "B-ISDN ATM Adaptation layer specification: Type 2 AAL", ITU-T Recommendation I363.2, FIG. 3/I.363.2 does not specify quality of service (QOS) at the AAL-SAP (Service Access Point) and how it is mapped into the ATM-SAP QOS in the event of multiplexing in the AAL.

Therefore, a need exists for a quality of service enforcement method for AAL multiplexed channels. A further need exists for a program storage device for implementing the enforcement method.

SUMMARY OF THE INVENTION

A method for deadline based scheduling for asynchronous transfer mode adaptation layer, type 2, messages, in accordance with the present invention, includes calculating, for a list of channels, a last possible transmit time for messages on each of the channels in accordance with system criteria. The list of channels is prioritized in an ordered list based on a last possible transmit time for the messages for each of the channels. The messages for the channels are transmitted in accordance with the ordered list.

In other methods of the present invention the step of calculating, for a list of channels, a last possible transmit time for messages on each of the channels in accordance with system criteria may include the step of calculating for a list of channels, a last possible transmit time for messages on each of the channels in accordance with a bandwidth, a delay time and a length of the message. The step of prioritizing the list of channels in an ordered list based on a last possible transmit time for the messages for each of the channels may include the step of weighting the calculation to adjust the priority of particular messages. The step of determining if a message is deliverable may be determined in accordance with a delay budget. The step of sending a quality of service error signal if the delay budget is exceeded may also be included. The step of repeating the steps of calculating and prioritizing to update the ordered list for each available channel may be included. The messages are preferably included in ATM data packets. The list of channels may be included on a channel identification queue.

A method for handling quality of service requests for asynchronous transfer mode adaptation layer, type 2, requests, in accordance with the present invention, includes calculating, for a given transmit request, a last possible transmit time for a message in accordance with system criteria, and determining whether the message is capable of completion in accordance with the system criteria. If the message is capable of completion, the request is inserted on a channel identification queue to await a next transmit opportunity. Otherwise, an error message is returned to indicate that the message is incapable of completion.

In other methods, the step of calculating may include the step of calculating, for a given transmit request, a last possible transmit time for a message in accordance with a bandwidth, a delay time and a length of the message. The step of indicating to a user that completion of the request is possible may also be included. The last possible transmit time message may be determined in accordance with a delay budget. The channel identification queue may include a list of channels with messages awaiting a transmit opportunity.

The methods and method steps of the present invention may be implemented by employing a program storage device readable by machine, tangibly embodying a program of instructions executable by the machine to perform the method steps.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 2 is a block/flow diagram for a system/method for deadline-based scheduling in accordance with the present invention.

DETAILED DESCRIPTION OF PREFERRED EMBODIMENTS

Figure 1:
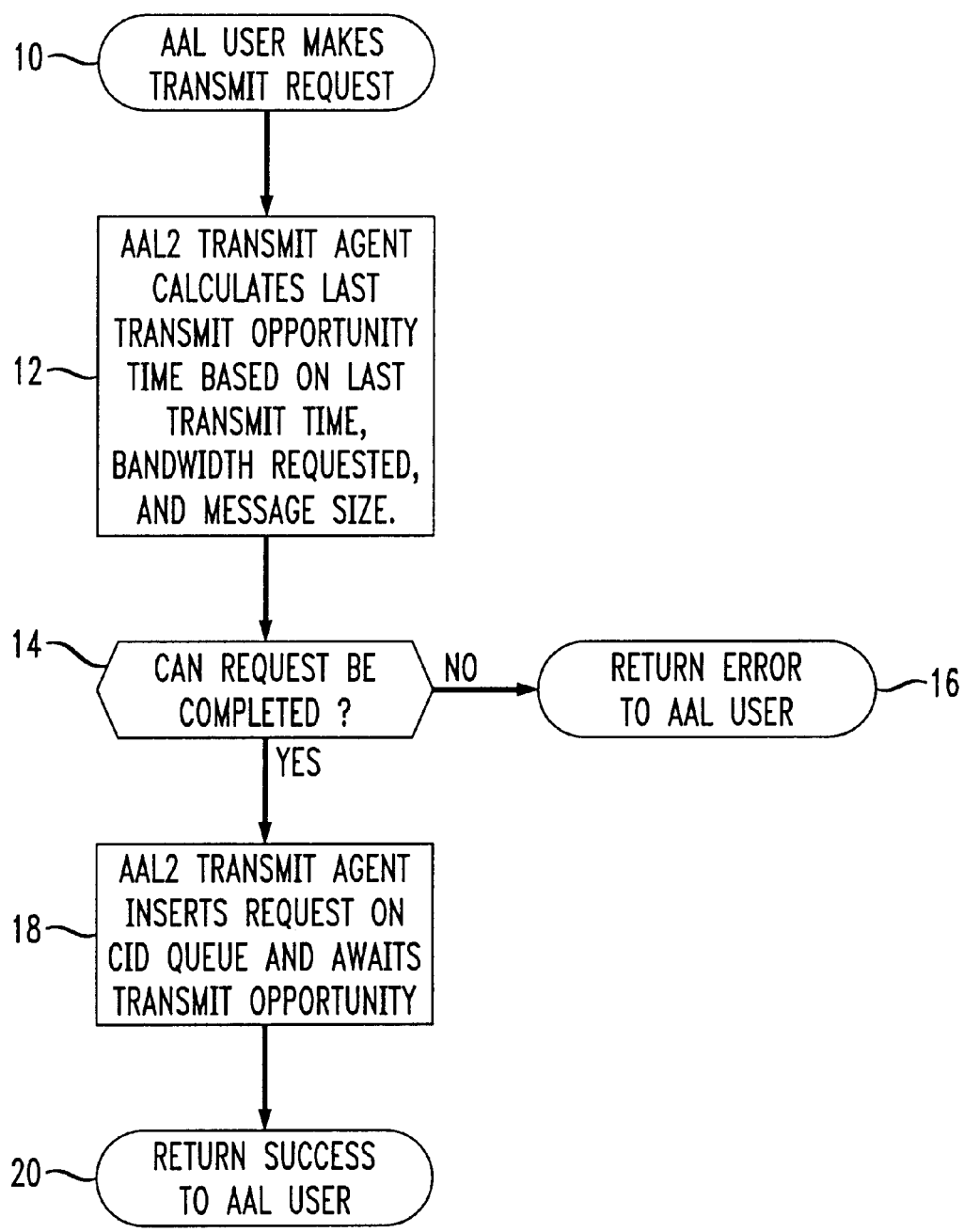
FIG. 1 is a block/flow diagram for a system/method for implementing a quality of service request in accordance with the present invention.

The present invention relates to scheduling methods, and more particularly to a method for enforcing quality of service (QOS) protocols for multiplexed channels in the ATM adaptation layer protocols. The present invention provides a scheduling method which provides fair access by all users of an asynchronous transfer mode (ATM) source. The bandwidth allocation and quality of service (QOS) enforcement of the present invention results in fair access to ATM resources. It should be noted that the present invention will be described in preferred embodiments, which employ AAL2 protocols; however, the invention is broader and may be applied to other protocols and systems.

The present invention preferably employs AAL2 for passing voice data across ATM networks; however data, such as video data or other types of information may be employed as well. If all users (voice channels) of the AAL2 channel have equal and fair access to a AAL-SAP (ATM Adaptation Layer—Service Access Point), call degradation will also be equal in the face of transmission errors. In addition, no user of the AAL-SAP can overuse its bandwidth, causing bandwidth starvation to other users of the AAL-SAP. This results in a base transmission station (BTS or a radio network controller (RNC)) for cellular networks that will result in less voice/data degradation when ATM networks become congested.

ATM includes technology for the communication of multimedia traffic including voice or data. There are many ways in which voice or data can be carried over ATM, and this fact is reflected in the many standards that have been developed. The present invention may be applied to many ATM sources and protocols; however, the invention will be described illustratively in terms of an AAL2 implementation. Further, the present invention may be employed in either wireless or wired networks. ATM Adaptation Layer Type 2 (or AAL2) includes variable bit rate capabilities and is advantageously employed by the present invention as a Quality of Service enforcement layer.

Quality of Service (QOS) can be defined on an end-to-end basis in terms of at least some of the following attributes of the end-to-end ATM connection: cell loss ratio, cell transfer delay, and cell delay variation. In particular, QOS is enforced by the present invention by prioritizing data packets in accordance with priority data. Priority data is preferably based on the requested bandwidth, the amount of data to be transferred from a source or to a destination and the latency of the transmissions link and/or system (including components, such as cell phones, personal digital assistants and the like).

The present invention provides a scheduling method that enforces the QOS for the AAL2 protocol. The present invention is employed to ensure that all users have equal and fair access to the AAL-SAP by specifying a bandwidth, to ensure a per-request-based maximum transmit time. The method, which is a deadline-based cell scheduling method, is applied on a per-cell basis (or message) when an ATM transmission opportunity is available.

It is to be understood that the elements shown in FIGS. 1 and 2 may be implemented in various forms of hardware, software or combinations thereof. Preferably, these elements are implemented in software on one or more appropriately programmed general purpose digital processors having a memory and input/output interfaces. It is also to be understood the data rate, the number of channels, types of channels and protocols may be changed within the scope of the present invention.

Referring now to the drawings in which like numerals represent the same or similar elements and initially to FIG. 1, a system/method for showing the handling of a QOS request in accordance with the present invention is shown. FIG. 1 shows the logic for establishing QOS parameters for a scheduler shown in FIG. 2 to use.

In block 10, an ATM Adaptation Layer (AAL) user makes a transit request or QOS request. The user may be a wireless or wired subscriber, making a call, sending data or otherwise sending information in an asynchronous transfer mode (ATM). ATM includes packets of data called cells. For AAL2 composite cells, the cells may include data from a plurality of channels, for example, 48 channels in each cell, along with destination information, and channel identifiers (CID) as part of the cell payload for identifying which channel the information is sent from.

The request made by the user includes a bandwidth request by the user, e.g., depending on the device employed (such as a 56 kbps modem) or a specific request for bandwidth.

In block 12, a transmit agent, such as, for example, a base transmission station (BTS) or radio network controller (RNC), calculates a last transmit opportunity time based on a previous last transmit time, the bandwidth requested and the message size. This is preferably performed on the AAL2 level. In this way, a dead-line is determined for the transmit request based on each individual request. In one example, a user makes a request for 64 kbps bandwith and has a message of 6.4 kbits in length. In this example, transmit time for a cell is budgeted to be about 250 msec including component delays (hardware and software delays). Transmit agent calculates the latest possible time in which all data (all 6.4 kbits) can be transferred in the budgeted time given the current load of the system. It should be noted the data is usually transmitted in pieces, each piece being included in a composite ATM cell for a given channel and broken up over a plurality of ATM cells.

As a result of this calculation, in block 14, a determination is made as to whether or not the request can be completed. If the request cannot be completed, for example due to queuing delays, an error message is sent to the AAL user, in block 16. This message may be a request to the user to retransmit or other error message warning the user that the call cannot be completed within the required time.

If the request can be completed, the transmit agent inserts the request on the channel ID (CID) queue to await the next transmit opportunity, in block 18. The user is notified that the request for QOS is a success, in block 20.

Referring to FIG. 2, a system/method for dead-line based scheduling in accordance with the present invention is shown. FIG. 2 shows the logic for a scheduler and an illustrative scheduling method. In a transmit agent (e.g., BTS or RNC), a transmit opportunity presents itself, in block 110. In block 112, the next CID is retrieved, and a determination is made as to whether the CID is the last CID in a list stored in the CID queue in block 114. If the CID is the last in the list, transmit buffers including data packets (ATM cells) are transmitted from a time-ordered list, in block 116. The time ordered list is generated by the transmit agent to prioritize the information to be transferred. That is, based on the deadline constraints set forth by the system, the CID which is closest to "timing out", will be next to be transmitted. In this way, a dead-line schedule is employed which optimizes the time available for transmitting voice or data over a network. Advantageously, the prioritization of the present invention results in a more efficient and fairer scheduling technique which not only transmits information in an efficient manner, but significantly reduces data from being dropped from the queue by timing out. If a message or messages is/are ahead of schedule, other messages in danger of timing out are placed before the message that is ahead of schedule. The ahead of schedule message is thereby put "on schedule" in accordance with its deadline and the other messages are saved from timing out.

Since the CID is the last CID in the list in block 116, information from that channel will be transmitted next at the given transmit opportunity. Data will be sent when a next transmit opportunity arises, in block 118.

If more than one CID exists in the list, block 120 calculates a last transmit opportunity time based on bandwidth and maximum transmit delay time (this may be a budgeted amount of time), as described above with reference to FIG. 1. This determines which CID in the list has priority on the time ordered list. In block 122, it is determined if the message can or will be delivered on time. The determination is again based on current system use, bandwith requested, and length of the message. In one embodiment, in block 120, types of calls, data and other criteria may be employed to weight (for example, in the priority calculation) certain calls or data to an increase their priority in the time ordered list. If it is determined in block 122 that the message will be delivered on time, the message is inserted in the time ordered list in accordance with its priority in block 124. Then, block 112 provides the next CID for consideration for the transmit opportunity.

If the message cannot be delivered on time, a QOS error signal is sent to the user, in block 126. Then, block 112 provides the next CID for the transmit opportunity.

The messages advantageously are permitted access to a Service Access Point (SAP) for transmission of data. A SAP may be employed for some of the following purposes. For example, when an application initiates an outgoing call to a remote ATM device, a destination SAP specifies the ATM address of the remote device, plus further addressing that identifies the target software entity within the remote device. When the application prepares to respond to incoming calls from remote ATM devices, a local SAP specifies the ATM address of the device housing the application, plus further addressing that identifies the application within the local device.

Advantageously, at each AAL-SAP transmit opportunity which may occur via interrupt, or by timer expiration, the AAL2 transmit agent scans all pending requests, and prioritizes the requests based on message size, message bandwidth, and delay time. Requests that are closest to their maximum transmit delay time are scheduled first, followed by requests that have more time to finish. This may be referred to as a 'deadline-monotonic' scheduling method.

Having described preferred embodiments of a system and method for quality of service (QOS) enforcement method (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for deadline based scheduling for asynchronous transfer mode adaptation layer, type 2, messages comprising the steps of:

calculating, for a list of channels, a last possible transmit time for messages on each of the channels in accordance with a bandwidth, a delay time and a length of the message;

determining if a message is deliverable in accordance with a delay budget;

prioritizing the list of channels in an ordered list based on the last possible transmit time for the messages for each of the channels; and transmitting the messages for the channels in accordance with the ordered list.

2. The method as recited in claim 1, wherein the step of prioritizing the list of channels in an ordered list based on a last possible transmit time for the messages for each of the channels includes the step of weighting the calculation to adjust the priority of particular messages.

3. The method as recited in claim 1, further comprising the step of sending a quality of service error signal if the delay budget is exceeded.

4. The method as recited in claim 1, further comprising the step of repeating the steps of calculating and prioritizing to update the ordered list for each available channel.

5. The method as recited in claim 1, wherein the messages are included in ATM data packets.

6. The method as recited in claim 1, wherein the list of channels are included on a channel identification queue.

7. The method as recited in claim 1, further comprising the step of indicating to a user that completion of the request is possible.

8. The method as recited in claim 1, wherein the last possible transmit time message is determined in accordance with a delay budget.

9. The method as recited in claim 1, wherein the channel identification queue includes a list of channels with messages awaiting a transmit opportunity.

10. A method for handling quality of service requests for asynchronous transfer mode adaptation layer, type 2, requests comprising the steps of:

calculating, for a given transmit request, a last possible transmit time for a message in accordance with a bandwidth, a delay time and a length of the message;

determining whether the message is capable of completion in accordance with the system criteria;

if the message is capable of completion,
        inserting the request on a channel identification queue to await a next transmit opportunity; and
        prioritizing a list of channels in an ordered list based on the last possible transmit time for the messages for each of the channels;

otherwise, returning an error message to indicate that the message is incapable of completion.

11. A program storage device readable by machine, tangibly embodying a program of instructions executable by the machine to perform method for deadline based scheduling for asynchronous transfer mode adaptation layer, type 2, messages, the method steps comprising:

calculating, for a list of channels, a last possible transmit time for messages on each of the channels in accordance with a bandwidth, a delay time and a length of the message;

determining if a message is deliverable in accordance with a delay budget;

prioritizing the list of channels in an ordered list based on a last possible transmit time for the messages for each of the channels; and transmitting the messages for the channels in accordance with the ordered list.

12. The program storage device as recited in claim 11, wherein the step of prioritizing the list of channels in an ordered list based on a last possible transmit time for the messages for each of the channels includes the step of weighting the calculation to adjust the priority of particular messages.

13. The program storage device as recited in claim 11, further comprising the step of sending a quality of service error signal if the delay budget is exceeded.

14. The program storage device as recited in claim 11, further comprising the step of repeating the steps of calculating and prioritizing to update the ordered list for each available channel.

15. The program storage device as recited in claim 11, wherein the messages are included in ATM data packets.

16. The program storage device as recited in claim 11, wherein the list of channels are included on a channel identification queue.

17. A method for deadline based scheduling for asynchronous transfer mode adaptation layer, type 2, messages comprising the steps of:
- calculating, for a list of channels, a last possible transmit time for messages on each of the channels in accordance with the latest time in which all data for each message can be transferred;
- determining if a message is deliverable in accordance with a delay budget;
- prioritizing the list of channels in an ordered list based on the last possible transmit time for the messages for each of the channels; and
- transmitting the messages for the channels in accordance with the ordered list.

18. A method as recited in claim 17, wherein the latest time is based on a previous last transmit time.

* * * * *